United States Patent [19]

Peuckert et al.

[11] Patent Number: 5,059,565
[45] Date of Patent: Oct. 22, 1991

[54] SILICON NITRIDE CERAMIC AND A PROCESS FOR ITS PREPARATION

[75] Inventors: Marcellus Peuckert; Cornelia Boberski, both of Hofheim am Taunus, Fed. Rep. of Germany

[73] Assignee: Hoechst Aktiengesellschaft, Frankfurt am Main, Fed. Rep. of Germany

[21] Appl. No.: 481,358

[22] Filed: Feb. 16, 1990

[30] Foreign Application Priority Data

Feb. 21, 1989 [DE] Fed. Rep. of Germany ....... 3905271

[51] Int. Cl.$^5$ ............................................. C04B 35/58
[52] U.S. Cl. ......................................... 501/97; 501/98
[58] Field of Search ............................ 501/97, 98, 103

[56] References Cited

U.S. PATENT DOCUMENTS

| 4,640,902 | 2/1987 | Lange | 501/98 X |
| 4,814,301 | 3/1989 | Steinmann et al. | 501/97 X |
| 4,830,991 | 5/1989 | Matsui | 501/97 |
| 4,883,776 | 11/1989 | Pyzik et al. | 501/97 X |
| 4,902,653 | 2/1990 | Komatsu et al. | 501/97 |
| 4,919,689 | 4/1990 | Pyzik et al. | 501/97 X |
| 4,920,085 | 4/1990 | Yoshida et al. | 501/97 |

FOREIGN PATENT DOCUMENTS 0190271 10/1984 Japan ..................................... 501/97

*Primary Examiner*—Karl Group
*Attorney, Agent, or Firm*—Curtis, Morris & Safford

[57] ABSTRACT

A multi-phase ceramic which is resistant to high temperatures and contains 25–85 % by weight of crystalline β-silicon nitride, 11 to 70% by weight of crystalline cubic HfO$_2$ and an amorphous glass phase which, in addition to silicon, contains at least one of the elements magnesium, yttrium and/or the rare earths and if appropriate aluminum, has good mechanical properties.

To prepare the ceramic, a mixture of 25–85% by weight of pulverulent a-silicon nitride, 11 to 70% by weight of monoclinic HfO$_2$ and 5–20% by weight of at last one oxide of the elements magnesium, yttrium and/or the rare earths (from Sm to Yb) is shaped to a body and this is sintered to give a dense body at 1,700–2,000° C.

9 Claims, No Drawings

SILICON NITRIDE CERAMIC AND A PROCESS FOR ITS PREPARATION

The invention relates to a silicon nitride ceramic which is resistant to high temperatures and essentially consists of the crystalline phases of β-silicon nitride and stabilized, cubic hafnium oxide and of an amorphous glass phase. The invention further relates to a process for the preparation of this ceramic.

The cubic modification of hafnium oxide which is stable at high temperatures changes back into the monoclinic modification at low temperatures if it is not stabilized. It is known that this stabilization of pure $HfO_2$ can be achieved by 2- or 3-valent cations, for example ions of the alkaline earths or of the rare earths (A. K. Kuznetsov et al. Russ. J. Inorg. Chem. (Engl. Transl.) 20, 425 (1975) and F. M. Spiridonov et al., Russ. J. Inorg. Chem. 14, 1332 (1969)).

It is also known that $Si_3N_4$ ceramic can be sintered using $Y_2O_3$ and $Al_2O_3$ in an $N_2$ atmosphere (T. Hayashi et al., J. Mat. Sci. 21 (1986) 3501).

Silicon nitride bodies which contain up to 10% by weight of hafnium oxide and in addition up to 10% by weight of an oxide of an element of the rare earths, for example Y or Ce, as sintering auxiliaries are known from European Application 0,227,471 (U.S. Pat. No. 4,902.653. It is stated that high additions of oxides of these rare earths have an adverse effect on the mechanical stability and the thermal shock resistance. In the amounts employed, of not more than 10% by weight, the hafnium oxide is said to lead to a glass having a high melting point.

It is also known that the addition of non-stabilized monoclinic and stabilized $ZrO_2$ in the form of dispersed individual grains in the sintered structure increases the strength and fracture toughness of the $Si_3N_4$ ceramic at room temperature (DE-OS 2,751,938; U.S. Pat. No. 4,322,249 F. F. Lange et al., J. Mat. Res. 2 (1987) 66). In this case, the increase in strength is based on an increase in the fracture toughness, which is achieved by transition reinforcement that is to say the change in the modification of the $ZrO_2$ from the tetragonal into the monoclinic modification. Nevertheless, this reinforcement mechanism acts only at low temperatures of below 1000° C. In contrast to $HfO_2$, the $ZrO_2$ also reacts with $Si_3N_4$ during sintering to give zirconium nitride and zirconium oxynitride. The results with $ZrO_2$ therefore cannot simply be applied to $HfO_2$.

Since the mechanical strengths of the ceramic bodies described are not yet very high, there was the object of providing silicon nitride bodies having improved mechanical properties.

The invention is based on the finding that the mechanical properties of the silicon nitride ceramic are advantageously influenced if hafnium oxide is present in amounts of 11 to 70% by weight in the form of crystalline cubic $HfO_2$. The cubic modification of the hafnium oxide can be stabilized by added oxides of magnesium, yttrium and/or the rare earths (from Sm to Yb).

The invention thus relates to a multi-phase ceramic which is resistant to high temperatures and contains at least 25% by weight of crystalline β-silicon nitride and an amorphous glass phase, wherein the ceramic contains 11 to 70% by weight of crystalline cubic hafnium oxide and the glass phase contains silicon and at least one of the elements magnesium, yttrium and/or the rare earths (from Sm to Yb) and if appropriate aluminum.

The problem of reaction with silicon nitride which is known from zirconium oxide does not occur in this ceramic. The increase in strength, described in previous publications (DE-OS 2,751,938) U.S. Pat. No. 4,322,249 due to transition intensification of dispersed structure grains of $ZrO_2$ or $HfO_2$ during the conversion of the tetragonal into the monoclinic modification plays no role in the present ceramic. The cubic hafnium oxide formed during sintering is stabilized completely by the addition of magnesium, yttrium and/or rare earths in the form of oxides or oxide precursors. The glass phase content of the novel multiphase ceramic is not more than 10% by weight, and is preferably less than 5% by weight. The aluminum in the glass phase does not contribute towards stabilization of the cubic phase of $HfO_2$.

The novel ceramic also differs in its structure from the structure of the silicon nitride ceramic according to EP-A2-227,471 (U.S. Pat. No. 4,902,653) with contents of up to 10% by weight of $HfO_2$, its structure being attributed to the higher content of hafnium oxide and the larger content of 5–20% by weight of an oxide of the elements Mg, Y and/or the rare earths (from. Sm to Yb) needed for stabilization of the cubic modification of the hafnium oxide. After etching away the glass phase, it can be seen (on polished grindings of the ceramic under an electron microscope) that the structure consists of elongated needles (β-$Si_3N_4$), which are matted into one another and are partly held together by a coherent matrix of hafnium oxide. X-ray spectra show that the hafnium oxide is present in crystalline form in the cubically stabilized form. The average degree of elongation of the silicon nitride needles is 5 to 10. The crystalline hafnium oxide surrounding the $Si_3N_4$ needles probably results in a higher strength than individual hafnium oxide grains dispersed between the needles. Since in the present case the hafnium oxide in the cubic modification is adequately stabilized, no internal stresses in the structure due to changes in modification arise. The high hafnium oxide content aids compaction during sintering. Since the hafnium oxide is completely crystallised after sintering, the resistance to high temperatures is not thereby impaired. The oxides of magnesium, yttrium and/or the rare earths added as sintering additives are at least partly taken up by the hafnium oxide in the course of sintering to form mixed crystals (up to 10 atom-%, based on the Hf). As a result of this mechanism, the content of an amorphous intergranular glass phase is reduced, which phase is not useful for the resistance of high temperatures. Only the elements from Sm to Yb of the rare earths are required. The rare earths Dy, Ho, Er and Yb are particularly preferred.

The glass phase formed probably consists of an oxynitride glass which contains silicon and at least one of the elements yttrium, magnesium and/or the rare earths (from Sm to Yb) and if appropriate aluminum.

The novel multi-phase ceramic preferably contains 25 to 85% by weight of β-$Si_3N_4$, 11–70% by weight of $HfO_2$ and 5 to 20% by weight of the elements magnesium, yttrium, aluminum and/or the rare earths (in each case calculated as oxide).

Preferred contents of hafnium oxide are 15 to 70% by weight and in particular 20 to 70% by weight. Ceramics containing 40 to 70% by weight of β-$Si_3N_4$, 20 to 40% by weight of $HfO_2$ and 5 to 20% by weight of the oxides of the sintering auxiliary elements, in particular 50 to 70% by weight of β-$Si_3N_4$, 20 to 30% by weight of hafnium oxide and 5 to 20% by weight of the oxides of the sintering auxiliary elements, are particularly preferred. The weight ratio of hafnium oxide/oxides of the sintering auxiliary elements is preferably 1:1 to 3:1, in particular 2:1 to 3:1.

The strengthened ceramic described, which is resistant to high temperatures, can be prepared by a process which can also be used for similar products of low hafnium content. This process for the preparation of a multi-phase ceramic shaped article, which is resistant to high temperatures, of silicon nitride and hafnium oxide comprises preparing a pulverulent mixture of 25 to 85% by weight of α-silicon nitride, 11 to 70% by weight of monoclinic hafnium oxide and 5 to 20% by weight of at least one oxide of the group comprising magnesium, yttrium and the rare earths (from Sm to Yb), or an equivalent amount of a precursor of this oxide, shaping this mixture to a body and sintering this body in a nitrogen atmosphere at 1,700 to 2,000° C. to give a dense ceramic. The contents of the oxides employed (and of $Si_3N_4$) correspond to those of the resulting ceramic body.

In addition to the sintering additives mentioned, it is also possible to add 0–4% by weight of $Al_2O_3$ or AlN (based on the total batch).

Instead of analytically pure hafnium oxide, it is also possible to employ industrial hafnium oxide which is contaminated by small amounts of zirconium oxide.

Compounds which are converted into the oxides under the sintering conditions (or already beforehand) can be employed as oxide precursors for the oxides of magnesium, yttrium and/or the rare earths. These include, for example, the hydroxides, nitrates, nitrites, acetates, oxalates and carbonates.

The components can be mixed in the dry state or in the presence of a liquid phase, for example an organic solvent, such as ethanol, isopropanol or hexane.

Preferably, silicon nitride, hafnium oxide and the compounds of the sintering auxiliary elements (including aluminum oxide or aluminum nitride) are dispersed, mixed and intensively ground in a solvent. The powder suspension is then dried, for example in a spray dryer. The resulting homogenized powder mixture can be shaped to ceramic green bodies by means of pressing or, after dilution with a liquid phase, by slip casting or injection molding. The nitrogen pressure during sintering is usually 0.1 to 10 MPa.

The invention is illustrated in more detail by the examples.

EXAMPLES

Mixtures of powders of a-$Si_3N_4$ (98% of the a- and 2% of the b-modification, average grain size $d_{50}$ = 0.7 lm), oxides of various sintering auxiliary elements and in some cases aluminum oxide ($d_{50}$ = 0.7 lm) were prepared. The weighing and mixing ratios can seen from the table. These mixtures were mixed intensively and ground in batches of 200 g in an attrition mill for two hours using grinding beads of aluminum oxide and isopropanol as the medium. The resulting ground suspension was separated off with a 20 lm sieve and dried by stripping off the isopropanol. The resulting homogeneous product was sieved in the dry state through a sieve of 160 lm mesh width and then pressed isostatically under 300 MPa to green bodies. For sintering, the green bodies were then heated to 1,800° C. in a nitrogen atmosphere (pressure: 0.1 MPa) in the course of one hour, kept at this temperature for one hour and then cooled again to room temperature in the course of three hours.

It was demonstrated by means of X-ray diffraction on the sintered samples of Examples 1–5 that the $HfO_2$ is in the cubic modification. Crystalline apatite of the general formula $A_{4+x}(SiO_4)_3N_x$, where x = about 1 and A = Ho or Yb, was also detected in the samples of Examples 4 and 5. The strengths of the multi-phase silicon nitride ceramic thus obtained ar summarized in the table.

Examples 6 and 7 are comparison examples.

In all the examples, the content of glass phases was less than 10% by weight (correspondingly less than 5% by volume).

The examples show that the bending strength is significantly increased in batches containing more than 10% by weight of $HfO_2$.

TABLE

| Example No. | Amount weighed out in % by weight | | | | | | Sintered density ($g/cm^3$) | Bending strength (MPa) at | |
|---|---|---|---|---|---|---|---|---|---|
| | $Si_3N_4$ | $HfO_2$ | $Al_2O_3$ | $Y_2O_3$ | $Ho_2O_3$ | $Yb_2O_3$ | | 25° C. | 1 200° C. |
| 1 | 68 | 20 | 2 | 10 | — | — | 3,81 | 820 | 424 |
| 2 | 63 | 25 | 2 | 10 | — | — | 3,96 | 831 | 430 |
| 3 | 58 | 30 | 2 | 10 | — | — | 4,16 | 795 | 416 |
| 4 | 60 | 20 | — | — | 20 | — | 4,22 | 811 | 453 |
| 5 | 65 | 20 | — | — | — | 15 | 4,11 | 826 | 456 |
| 6(Comparison) | 78 | 10 | 2 | 10 | — | — | 3,52 | 696 | 402 |
| 7(Comparison) | 88 | — | 2 | 10 | — | — | 3,27 | 622 | 365 |

We claim:

1. A multi-phase ceramic which is resistant to high temperatures and contains 25–85% by weight of crystalline β-silicon nitride and an amorphous glass phase, wherein the ceramic contains 11 to 70% by weight of crystalline cubic $HfO_2$ and the glass phase contains, in addition to silicon, at least one element selected from the group consisting of the elements magnesium, yttrium and the rare earths .

2. A ceramic as claimed in claim 1, in which the glass phase consists of an amorphous oxynitride glass which contains silicon and at least one element selected from the group consisting of yttrium, magnesium, Sm, Eu, Gd, Tb, Dy, Ho, Er, Tm, Yb.

3. A ceramic as claimed in claim 1, which also contains a crystalline apatite of the formula $A_{4+x}(SiO_4)_3N_x$, in which x is about 1 and A is selected from the group consisting of Y, Sm, Eu, Gd, Tb, Dy, Ho, Er, Tm, and Tb.

4. A ceramic as claimed in claim 1, in which the crystalline cubic hafnium oxide is present as a mixed crystal with at least one oxide of, Sm, Eu, Gd, Tb, Dy, Ho, Er, Tm, and Yb.

5. A process for the preparation of a multi-phase silicon nitride ceramic which is resistant to high temperatures starting from $Si_3N_4$ and $HfO_2$, which comprises preparing a mixture of 25–85% by weight of pulverulent α-silicon nitride, 11 to 70% by weight of monoclinic $HfO_2$ or a hafnium oxide precursor and 5–20% by weight of at least one oxide of an element selected from this group consisting of magnesium, yttrium, Sm, Eu, Gd, Th, Dy, Ho, Er, Tm and Yb, or equivalent amounts of corresponding oxide precursors, shaping this mixture to a body and sintering this body in a nitrogen atmosphere at 1,700 to 2,000° C. to give a dense 6. The process as claimed in claim 5, wherein the nitrogen pressure during sintering is 0.1 to 10 MPa.

7. The process as claimed in claim 5, wherein the mixture contains 0–4% by weight of $Al_2O_3$ or AlN as an additional sintering additive.

8. A ceramic as claimed in claim 1, in which the glass phase contains aluminum.

9. A ceramic as claimed in claim 2, which also contains a crystalline apatite of the formula $A_{4+x}(SiO_4)_3N_x$, in which x is about 1 and A is an element selected from the group consisting of Y, Sm, Eu, Gd, Tb, Dy, Ho, Er, Tm, and Yb.

* * * * *